No. 636,527. Patented Nov. 7, 1899.
W. E. HEDGES.
SEED PLANTER.
(Application filed July 15, 1899.)
(No Model.) 2 Sheets—Sheet 1.
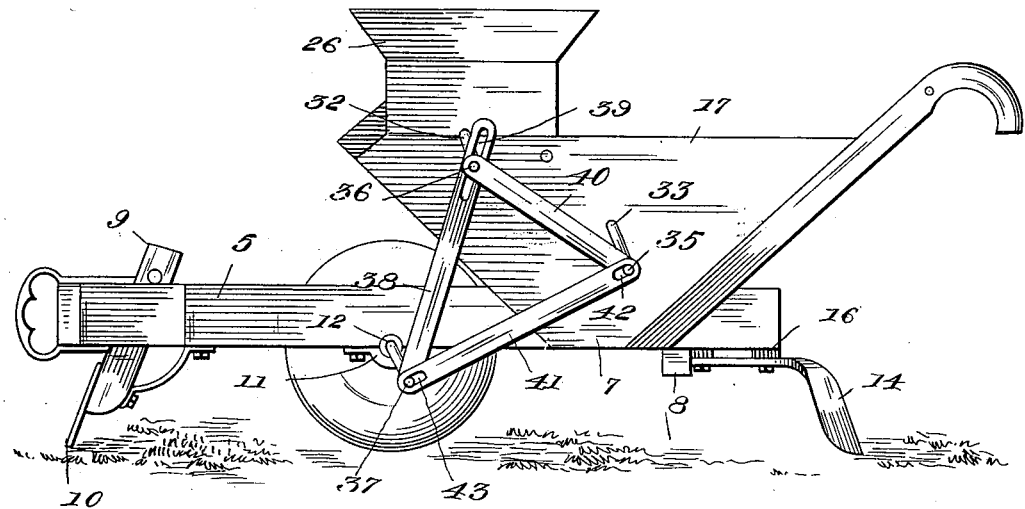
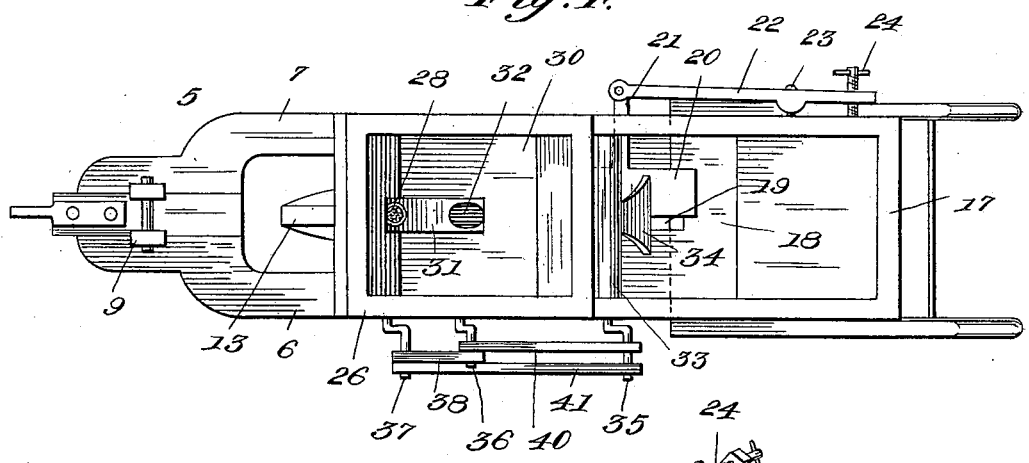
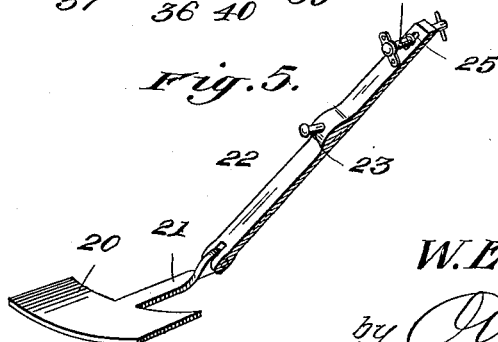
Witnesses
F. W. Riley,
Chas. E. Brock
Inventor
W. E. Hedges,
by
Attorneys
THE NORRIS PETERS CO., PHOTO-LITHO., WASHINGTON, D. C.

No. 636,527. Patented Nov. 7, 1899.
W. E. HEDGES.
SEED PLANTER.
(Application filed July 15, 1899.)
(No Model.) 2 Sheets—Sheet 2.

Witnesses
Inventor
W. E. Hedges,

UNITED STATES PATENT OFFICE.

WILLIAM E. HEDGES, OF POLK, ARKANSAS.

SEED-PLANTER.

SPECIFICATION forming part of Letters Patent No. 636,527, dated November 7, 1899.

Application filed July 15, 1899. Serial No. 723,929. (No model.)

*To all whom it may concern:*

Be it known that I, WILLIAM E. HEDGES, a citizen of the United States, residing at Polk, in the county of Sharp and State of Arkansas, have invented a new and useful Seed-Planter, of which the following is a specification.

My invention relates to machines for planting seed, such as cotton-seed, corn, peas, beans, cane-seed, broom-corn, and any other small grain which can be put in with a planter.

The object of my invention is to generally improve planters, and especially to improve the means for transmitting the rotary motion of the traction-wheel shaft to the shafts in the seedboxes, by providing means for accomplishing this result without the use of belt or cog gearing, such means being of such material and construction that it can be made by the farmer himself with slight assistance by the blacksmith, thereby enabling the farmer to provide himself with planters at very low cost which will effectually perform all the functions of the costly machines offered by the dealer or manufacturer.

With this object in view the invention consists in the improved construction, arrangement, and combination of parts hereinafter fully described and afterward specifically pointed out in the claims.

In order to enable others skilled in the art to which my invention most nearly appertains to make and use the same, I will now proceed to describe its construction and operation, reference being had to the accompanying drawings, forming part hereof, in which—

Figure 2:
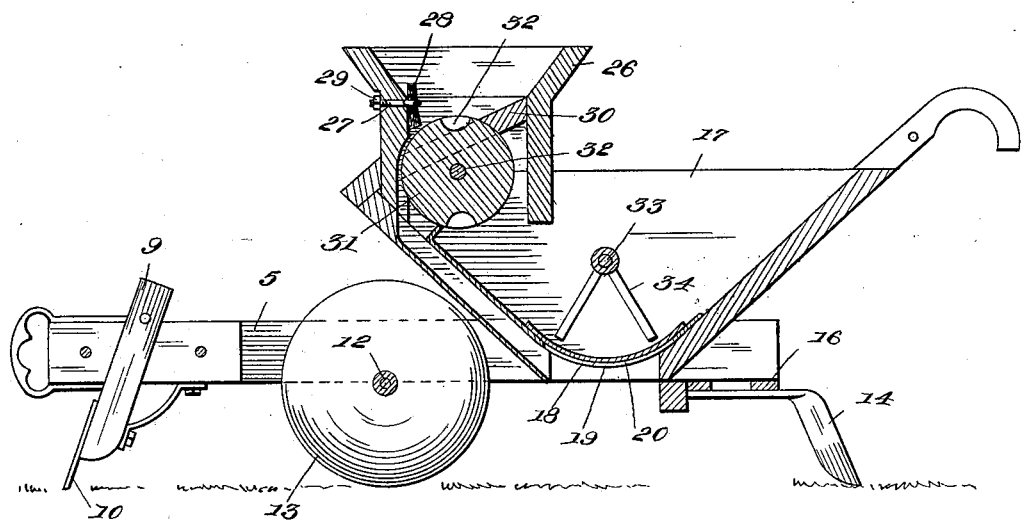
Figure 3:
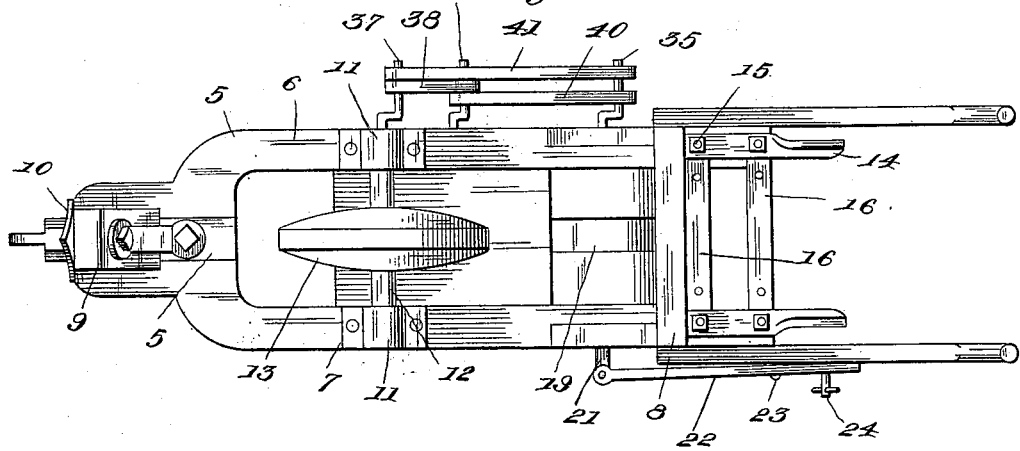

Figure 1 is a view in side elevation of a planter constructed in accordance with my invention. Fig. 2 is a vertical longitudinal sectional view of the same. Fig. 3 is a bottom plan view of the same. Fig. 4 is a top plan view of the same. Fig. 5 is a detail perspective view.

Like numerals of reference mark the same parts wherever they appear in the several figures of the drawings.

Referring to the drawings by numerals, 5 indicates the main frame, which is forked, forming two parallel bars 6 7, connected near their rear ends by a cross-bar 8. In the beam or frame 5 is secured the stem 9, to which the blade 10 for opening the furrow is attached, and bearings 11 11 for a shaft 12, carrying a traction-wheel 13. At the rear of the frame are pivotally secured the coverers 14, adjustable to bring their working blades nearer together, if desired, and fixed in position by means of set-screws 15, engaging them, and a cross-bar 16, secured to the frame.

17 indicates the cotton-seed box, secured between the frame-bars, having straight sides and end converging from the top, the bottom being open. Within this box, over the open bottom, is a sheet-metal lining 18, having an opening 19, which may be contracted to any desired width by a sliding plate 20, secured to the inner end of a rod 21, projected through the side of the cotton-seed box and attached outside of the box to one end of a lever 22, pivoted to the box on a loose bolt 23 and regulated by a set-screw 24, passing through a slot 25 in its opposite end.

In the top of the cotton-seed box is fitted a corn or small-grain box 26, inside of one end of which is secured an eyebolt 27, in which is a brush 28, the brush being adjustable in the eye and securable in any adjustment by the nut 29 on the eyebolt. The box 26 is provided with an inclined slotted partition 30, and corn-wheel 31 is secured on a shaft 32, journaled in the sides of the box, said corn-wheel projecting into the slot of the partition and against the brush 28 and being provided with pockets in its periphery.

In the cotton-seed box is journaled a stirrer rock-shaft 33, having radial teeth 34 and a crank 35 outside the box. The shaft 32 also has a crank 36 and the traction-wheel shaft 12 a crank 37, all of the cranks being on the same side of the machine. A bar 38 connects cranks 37 and 36, the slot 39 in the bar engaging over the crank 36. A bar 40 connects cranks 35 and 36, and a bar 41, with short slots 42 43 in its ends, connects the cranks 35 and 37. The arm of the crank 35 is longer than those of the cranks 36 and 37.

When the planter is drawn along in the usual manner, the traction-wheel and its shaft are rotated by contact of the wheel with the ground, and by means of the bar-and-crank connections described the shaft 32 is rotated, turning the corn-wheel, and the shaft 32 rocked, oscillating its teeth and stirring the cotton-seed.

Having thus fully described my invention, what I claim as new, and desire to secure by Letters Patent of the United States, is—

1. In a planter, the combination with the frame, of a cotton-seed box secured therein, a corn-box secured in the cotton-seed box, a shaft journaled in the frame, a traction-wheel thereon, a rock-shaft journaled in the cotton-seed box, a shaft journaled in the corn-box, cranks on each of these three shafts on the same side of the machine, and bars connecting the cranks, substantially as described.

2. In a planter, the combination with the frame of a cotton-seed box secured therein, a corn-box secured in the cotton-seed box, a shaft journaled in the frame, a traction-wheel thereon, a rock-shaft journaled in the cotton-seed box, a shaft journaled in the corn-box, cranks on each of these three shafts on the same side of the machine, a bar on the traction-shaft crank having a slot engaging the corn-box-shaft crank, a bar connecting the corn-box-shaft crank and the rock-shaft crank, and a bar with short slots in each end engaging the traction-shaft crank and rock-shaft crank, substantially as described.

WILLIAM E. HEDGES.

Witnesses:
N. P. WILES,
L. J. MILLER.